United States Patent Office 3,434,976
Patented Mar. 25, 1969

3,434,976
PREPARATION OF SILICA-ALUMINA CATALYST
George J. Surland and John S. Magee, Jr., Baltimore, Md., assignors to W. R. Grace & Co., New York, N.Y., a corporation of Connecticut
No Drawing. Filed May 11, 1965, Ser. No. 454,982
Int. Cl. B01j 11/40
U.S. Cl. 252—453    3 Claims

ABSTRACT OF THE DISCLOSURE

Silica-alumina catalysts containing low concentrations of sulfate ion are prepared by washing a precipitated silica-alumina gel first with an acid solution, and subsequently with an ammonium carbonate solution.

---

This invention relates to a method for making silica-alumina catalysts and more particularly to a method for making silica-alumina hydrocarbon conversion catalysts containing greater than 10 percent alumina and having a sulfate content of less than 1 percent.

In summary, the process of this invention is a method for manufacturing silica-alumina catalysts including the steps of washing silica-alumina gel containing alkali metal and sulfate ions with an aqueous solution substantially free from alkali metal ions and having a pH within the range of from 2 to 7 to remove alkali metal cations from the gel, and washing the gel with an ammonium carbonate solution to remove sulfate ions from the gel.

Often it is desirable to incorporate alumina in silica gels in the preparation of catalyst materials because of its catalytic activity in certain processes. The silica-alumina gels can be made by a number of different methods, many of which involve the use of aluminum sulfate or sulfuric acid. For example, a silica gel formed by neutralizing sodium silicate with sulfuric acid can be thereafter impregnated with a solution of aluminum sulfate, and the mixture subsequently can be neutralized to precipitate alumina in the gel. Another method which can be employed involves neutralizing a solution of sodium silicate with a solution of aluminum sulfate and thereby coprecipitating silica and alumina.

When silica-alumina gels are prepared by methods such as those described above, soluble salts, particularly sodium sulfate, are deposited in the gel. These salts are generally detrimental to the physical and catalytic properties of the gel and must be removed to form an efficient catalyst. The presence of the sulfate ions in the catalysts is especially undesirable because of its effect in impairing the catalytic activity of the gel when present in concentrations above about 1 percent. Removal of sulfate ions is particularly difficult in gels containing high alumina concentrations, i.e. alumina concentrations of greater than 30 percent.

In U.S. Patent 2,684,340 it was proposed that sulfate concentrations could be reduced in silica-alumina gels containing up to 24 percent alumina by first washing the freshly precipitated gel with an acidic solution and then washing the gel with an ammonium hydroxide solution. Reduction of the sulfate ion content of the gels to less than 1 percent by this process was reported in the patent.

The washing method disclosed in U.S. Patent 2,684,340 has been found to be inadequate for removing sulfate ions from silica-alumina gels containing above 30 percent alumina. It was found that this conventional procedure could not readily lower sulfate contents in these higher alumina catalysts to less than 3 percent, a sulfate ion concentration which was too high to meet the industrial requirements for cracking catalysts.

It is an object of this invention to provide a method for removing sulfate ions from silica-alumina catalysts containing greater than 5 percent alumina.

It is another object of this invention to provide a washing procedure for the removal of sulfate ions from silica-alumina catalysts containing greater than 30 percent alumina to less than 1 percent.

All concentrations are herein given in terms of weight percents unless otherwise provided.

Silica-alumina gels formed by commercial processes are ordinarily contaminated with soluble salts containing sodium and sulfate ions. In one conventional process, silica-alumina gels are produced from sodium silicate, alumina sulfate, and sulfuric acid. A typical preparation according to this process comprises preparing a sodium silicate solution having a silica to sodium oxide weight ratio of from 3–4 to 1 and a silica content of from about 3 to 8 percent. The silica is gelled with sulfuric acid at a temperature up to about 165° F. Following gelation, an alumina sulfate solution is added to the gelled silicate. If necessary, additional alkali metal hydroxide is added to the slurry to precipitate the alumina from the aluminum sulfate solution. The product silica-alumina gel is contaminated with sulfate ions derived from the aluminum sulfate and sulfuric acid and with sodium ions derived from the sodium silicate and the alkali metal hydroxide added to precipitate the alumina.

Another conventional process comprises cogelation of the silica and alumina. In this process, a sodium silicate solution is mixed directly with an aluminum sulfate solution. The aluminum sulfate solution can contain additional free acid such as sulfuric acid to obtain the desired neutralization of the sodium silicate. The product silica-alumina cogel is contaminated with alkali metal ions from the silicate and sulfate ions from the alumina sulfate solution.

Another industrial process for forming silica-alumina gels is described in U.S. Patent 2,886,512. In this process, a sodium silicate solution having a silica to soda weight ratio of from 3 to 4:1 is diluted with water to a silica content of from about 3 to 8 percent. The silica is gelled with carbon dioxide at a temperature up to 165° F. Following gelation, an aluminum sulfate solution is added to the gelled sodium silicate in a quantity sufficient to provide the desired alumina concentration in a final gel. The concentration of the aluminum sulfate solution can be varied and additional sulfuric acid can be employed therein sufficient to neutralize all the alkali metal hydroxide and bicarbonates originating from the sodium silicate, converting the carbonate neutralization product to gaseous carbon dioxide. The carbon dioxide released from the system by the sulfate ion is recovered and recycled for gelation of additional sodium silicate.

The silica-alumina gel formed in the above processes can be manipulated to provide a product having the desired physical form. For example, the gel can be permitted to set and can thereafter be broken up in and screened to form particles having the desired size. These particles can be pilled or extruded with a suitable binder to form the desired physical shapes. In these procedures the silica-alumina particles are washed to remove the soluble reaction products from the gel.

In certain fluid catalytic processes, silica-alumina gels in the form of microspheres are desired. Microsphere silica-alumina gels can be formed by first filtering an initial silica-alumina gel slurry to separate the silica-alumina gel from the soluble reaction products. The filter cake is then reslurried with a minimum quantity of water to form a slurry of maximum silica-alumina content suitable for spray-drying. The slurry is then spray-dried, collected, washed free of sodium and sulfate impurities, and finally flash-dried.

In each of the above processes, the quantity of aluminum sulfate employed is sufficient to provide the desired alumina content in the final silica-alumina gel. For certain catalytic processes, silica-alumina gels having an aluminum content from 30 to 60 percent and preferably between 35 to 50 percent are desired. It is with these gels that the conventional washing procedures described above have been found inadequate to lower the sulfate ion content of the gel to the requisite low level.

In the process of this invention, the silica-alumina gel is first washed with an acidic solution having a pH within the range of from 2 to 7 for a time sufficient to remove substanitally all of the alkali metal ions from the gel. The acidic wash is continued until the alkali metal content of the gel, expressed as the oxide, is less than 0.1 percent. Hydrochloric acid solutions can be employed for this washing step. Alternatively, a dilute aluminum sulfate solution or a dilute ammonium sulfate solution can be employed. Ammonium sulfate solutions are preferred for economic reasons. Ammonium sulfate solutions having a concentration of from 2 to 10 percent are suitable for washing the gel to remove the alkali metal ions.

The silica-aluminum gel is then washed with an ammonium carbonate solution to remove the sulfate ions. The ammonium carbonate solution must be substantially free from alkali metal ions and can have a concentration within the range of from 1 to 10 percent and preferably from 1 to 5 percent ammonium carbonate. The silica-alumina gel is washed with the ammonium carbonate solution for a time sufficient to remove substantially all sulfate ions from the gel. Washing the gel with the sulfate solution until the sulfate content is less than 1 percent is satisfactory. The ammonium carbonate washing solution temperature can be within the range of from 80 to 160° F. and preferably within the range of from 120 to 140° F.

The silica-alumina gel can be washed with an aqueous ammonium hydroxide solution prior to washing with the ammonium carbonate solution to remove a portion of the sulfate ions from the gel. Dilute ammonium hydroxide solutions having a pH within the range of from 8 to 10 and a temperature within the range of from 80 to 160° F. are suitable for washing the gels. However, the sulfate ion content of silica-alumina gels having an alumina content greater than 30 percent can be lowered only to about 3 percent sulfate ions by merely washing with an ammonia solution. Washing with the ammonium carbonate solution is a critical step of the process of this invention.

The silica-alumina gel is normally given a final wash with water which is substantially free from alkali metal and sulfate ions to remove residual ammonium carbonate from the gel. Deionized water is preferred in this step. The wash water temperature can be within the range of from 80 to 160° F. For certain processes, the final wash with the deionized water is unnecessary.

A wide variety of suitable washing procedures can be employed in the process of this invention. For example, the washing step can comprise dispersing the gel in a rotating washing drum followed by physical separation of the gel from the water such as is disclosed in U.S. Patent 2,684,340. Alternatively, the silica-alumina gel can be collected on a filter or washing table, and the wash water can be contacted with the collected gel. Obviously, other physical washing steps known in the art can be employed in the process of this invention.

The invention is further illustrated by the following specific, but nonlimiting examples.

EXAMPLE 1

A silica-alumina gel was produced by overlap gelation. A sodium silicate solution having a silicate content, expressed as silica, of 5.5% was pumped through a 50 ft. length of tubing at a rate of 7500 g. of slurry in 9.5 minutes. Carbon dioxide was introduced into the tubing at a rate sufficient to effect gelation of the silicate 20 sec. after the mixture left the tubing. Sufficient quantities of aluminum sulfate were added to the gel slurry to provide 47% alumina in the final product. The pH of the silica-alumina gel slurry was adjusted to 8.3 with an ammonium hydroxide solution, and the silica-alumina was separated from the reaction mixture by filtration. The silica-alumina gel was dried overnight at 230° F. and ground in a micropulverizer to the final size desired.

A 380 g. sample of the silica-alumina gel was collected on a filter. The filter cake was washed with four 2 liter portions of an aqueous 4% ammonium sulfate solution having a temperature of 140° F. The filter cake was then washed with three 3 liter portions of an ammonium hydroxide solution having a pH of 9.5. The filter cake was then washed with 4 liters of deionized water having a temperature of 140° F., three 5 liter portions of an ammonium hydroxide solution having a pH of 9.5 and a temperature of 140° F., and finally with 5 liters of deionized water having a temperature of 140° F. The silica-alumina gel was analyzed at this stage, and the gel was found to comprise, on a dry basis, 0.015% $Na_2O$, 3.2% $SO_4$ and 47% $Al_2O_3$.

The silica-gel was then divided into two 190 g. portions, Sample A and Sample B. Sample A was washed with three 2 liter portions of an aqueous 1% ammonium carbonate solution having a temperature of 140° F. and was then washed with 2 liters of deionized water having a temperature of 140° F. The analysis of Sample A, on a dry basis, was found to be 0.38% $SO_4$, 0.017% $Na_2O$, and 47% $Al_2O_3$.

Sample B of the silica-alumina gel was washed with three 2 liter portions of an aqueous 5% ammonium carbonate solution having a temperature of 140° F. Sample B was found to have the analysis of 0.19% $SO_4$, 0.017% $Na_2O$, and 47% $Al_2O_3$.

As shown above, even extensive washing with ammonium hydroxide solutions and deionized water is insufficient to lower the sulfate ion content of the silica-alumina gel to less than about 3%. In contrast, washing of the silica-alumina gel with an ammonium carbonate solution effects immediate removal of sulfate ions to a very low level.

EXAMPLE 2

A silica-alumina gel was produced by overlap gelation by the general procedure of Example 1. A sodium silicate solution having a silicate content, expressed as silica, of 5.5% was pumped through a 50 ft. length of tubing to form 15,000 g. of solution. Carbon dioxide was introduced into the tubing at a rate sufficient to effect gelation of the silicate 1.5 hours after the mixture left the tubing. Sufficient quantities of aluminum sulfate were added to the gel slurry to provide about 39% alumina in the final product. The pH of the silica-alumina gel slurry was adjusted to 9.0 with an ammonium hydroxide solution, and the silica-alumina was separated from the reaction mixture by filtration. The silica-alumina gel was dried overnight at 230° F. and ground in a micropulverizer to the final size desired.

A 1400 g. portion of the silica-alumina gel was washed accordingly to the procedure of this invention. The silica-alumina gel was washed with four 4 liter portions of an aqueous 4% ammonium sulfate solution having a temperature of 140° F., with 4 liters of deionized water having a temperature of 140° F., with six 4 liter portions of an aqueous 5% ammonia carbonate solution having a temperature of 140° F., and finally with two 4 liter portions of deionized water having a temperature of 140° F. The product silica-alumina gel had an analysis of 0.025% $Na_2O$, 0.18% $SO_4$ and 38.8% $Al_2O_3$.

Obviously, many modifications and variations of this invention may be made without departing from the essence and scope thereof, and only such limitations should be applied as are indicated in the claims.

We claim:
1. In an improved process for obtaining a silica-alumina gel catalyst which is substantially free of alkali metal and sulfate ions which comprises:
   (a) preparing a silica-alumina gel from an alkali metal silicate and aluminum salt,
   (b) washing said gel with an aqueous ammonium sulfate solution having a pH of 2 to 7 to remove alkali metal ions, and subsequently
   (c) washing said gel to remove sulfate ion, the improvement which comprises:
      conducting said washing step (c) with an aqueous solution of ammonium carbonate.
2. The process of claim 1 wherein said gel contains greater than about 30% by weight alumina.
3. The process of claim 1 wherein said aqueous ammonium carbonate solution contains 1 to about 10% by weight ammonium carbonate.

References Cited

UNITED STATES PATENTS

| | | | |
|---|---|---|---|
| 2,870,082 | 1/1959 | Sieg et al. | 252—453 XR |
| 2,908,635 | 10/1959 | Ogorzaly | 252—453 XR |
| 3,066,092 | 11/1962 | Winyall | 252—453 XR |
| 3,260,680 | 7/1966 | Sanford et al. | 252—455 |
| 2,315,024 | 3/1943 | Sturgeon | 252—455 |

FOREIGN PATENTS 583,532  9/1959  Canada.

DANIEL E. WYMAN, *Primary Examiner.*

C. F. DEES, *Assistant Examiner.*

U.S. Cl. X.R.

252—455